United States Patent [19]

Kakizaki et al.

[11] Patent Number: 5,365,432
[45] Date of Patent: Nov. 15, 1994

[54] SYSTEM AND METHOD FOR OPTIMALLY CONTROLLING DAMPING FORCE CHARACTERISTICS OF FRONT AND REAR SUSPENSION UNITS OF FOUR-WHEELED VEHICLE

[75] Inventors: Shinobu Kakizaki; Makoto Kimura, both of Kanagawa, Japan

[73] Assignee: Atsugi Unisia Corporation, Japan

[21] Appl. No.: 798,888

[22] Filed: Nov. 27, 1991

[30] Foreign Application Priority Data

Nov. 30, 1990 [JP] Japan .................................. 2-338747

[51] Int. Cl.⁵ ............................................. B60G 17/01
[52] U.S. Cl. ........................ 364/424.05; 364/426.01; 364/426.02; 280/703; 280/707
[58] Field of Search ................ 364/424.05, 424.01; 280/707, 702, 703, 772, 840, 724, 708

[56] References Cited

U.S. PATENT DOCUMENTS

| | | | |
|---|---|---|---|
| Re. 33,601 | 6/1991 | Asami et al. ........................ | 280/707 |
| 4,323,319 | 6/1994 | Shimizu ........................... | 364/424.05 |
| 4,602,805 | 7/1986 | Tanaka et al. ..................... | 280/707 |
| 4,634,143 | 1/1987 | Asami et al. ...................... | 280/707 |
| 4,697,237 | 9/1987 | Tanaka et al. ..................... | 364/424 |
| 4,714,271 | 12/1987 | Buma et al. ....................... | 280/707 |
| 4,717,173 | 1/1988 | Sugasawa et al. ................... | 280/707 |
| 4,729,580 | 3/1988 | Buma et al. ....................... | 280/707 |
| 4,756,516 | 7/1988 | Tondato ........................... | 267/153 |
| 4,961,483 | 10/1990 | Yamaoka et al. .................... | 188/299 |
| 5,040,775 | 8/1991 | Miyakawa .......................... | 267/220 |
| 5,100,167 | 3/1992 | Kamimura .......................... | 364/424.05 |
| 5,138,554 | 8/1992 | Wada .............................. | 364/424.05 |
| 5,162,996 | 11/1992 | Matsumoto et al. .................. | 364/424.05 |
| 5,163,660 | 11/1992 | Yamaoka .......................... | 267/140.1 |
| 5,168,448 | 12/1992 | Matsumoto et al. .................. | 364/424.05 |

FOREIGN PATENT DOCUMENTS

| | | |
|---|---|---|
| 4015221 | 11/1990 | Germany . |
| 60-47612 | 4/1985 | Japan . |
| 62-43909 | 3/1987 | Japan . |
| 64-60411 | 3/1989 | Japan . |
| 3-84237 | 4/1991 | Japan . |

*Primary Examiner*—Thomas G. Black
*Assistant Examiner*—Jacques Harold Louis-Jacques
*Attorney, Agent, or Firm*—Ronald P. Kananen

[57] ABSTRACT

A controller of each suspension unit is provided with a time difference setting block for deriving a time difference between a time at which front wheels have passed over a given portion of road surface and a time at which rear wheels have passed on the same portion of road surface, a correction block for deriving a correction value corresponding to a difference between a required optimum damping force on each of the front wheel suspension units and actually generated damping force on each of the front wheel suspension units, and a rear wheel suspension controlling block for deriving an optimum damping force on the basis of a presently input signal derived from a vehicular behavior detector installed on a rear wheel side and the correction value past by the time difference and outputting a change control signal to the damping force coefficient changing mechanism installed for the rear wheel suspension units.

13 Claims, 5 Drawing Sheets

SYSTEM AND METHOD FOR OPTIMALLY CONTROLLING DAMPING FORCE CHARACTERISTICS OF FRONT AND REAR SUSPENSION UNITS OF FOUR-WHEELED VEHICLE

BACKGROUND OF THE INVENTION:

(1) Field of the Invention

The present invention relates to a system and method for controlling a damping force characteristic of a shock absorber (hereinafter referred to as a damper) installed between an unsprung mass and a sprung mass of an automotive vehicle.

(2) Description of the Background Art

Japanese Utility Model Registration Application Publications No. Showa 80-47612 and No. Showa 61-110412 exemplify systems for controlling damping force coefficients of dampers.

The former disclosed damping force characteristic controlling system determines a road surface condition on the basis of a data of a distance from the damper position to the ground, i.e., road surface derived from a distance sensor and controls its damping force according to the road surface condition.

The latter disclosed damping force characteristic controlling system detects peak position values of a piston member of the damper at an expansion stroke side and compression stroke side of the damper on the basis of a displacement of the damper position and controls the damping force to become samller when the peak position values fall in a neutral range of a predetermined width with a neutral position of a relative displacement of the damper as a center. Then, in the latter disclosed damping force controlling system, the width of the neutral range is varied according to a vehicle speed so that a delay in a control timing for changing the damping force characteristic is considerably reduced.

However, the former damping force controlling system requires the distance sensor so that the system structure becomes accordingly complex and cost of manufacture of the system becomes increased.

In addition, in the latter controlling system, the delay in the control timing while the vehicle is running at high speeds, is reduced by the change in the width of the neutral range according to the vehicle speed. However, the latter disclosed damping force controlling system provides a rising delay of applying the changed damping force or its response delay so that the inherent control delay cannot completely be eliminated.

SUMMARY OF THE INVENTION

It is, therefore, an object of the present invention to provide a system and method for controlling a damping force characteristic for a damper of a vehicular suspension which simultaneously achieve a simplification of system structure and optimization of a control timing of the system, particularly of the damping force characteristic.

The above-described object can be achieved by providing a damping force controlled suspension system for an automotive vehicle, comprising: a) a plurality of suspension units, each suspension unit being intervened between one of front and rear tire wheels and vehicular body and having relatively displaceable sprung mass member and unsprung mass member; b) damping force coefficient changing means, installed between the sprung mass member and unsprung mass member in each suspension unit, responsive to an input change control signal for changing a damping force acted upon a direction of relative displacement between the sprung mass member and unsprung mass member at a multiple number of stages; c) detecting means, installed on one of the front wheel positions and on one of the rear wheel positions, for detecting a factor of determining a vehicular behavior and outputting signals indicative thereof; d) controlling means responsive to the signals derived from the detecting means for outputting the change control signal to each damping force coefficient changing means so that the damping force generated by the damping force coefficient changing means is changed on the basis of the signals derived from the detecting means; e) time difference setting means for deriving a time difference between a time at which the front wheels have passed on a road surface and a time at which the rear wheels have passed on the same road surface; f) correction means for deriving a correction value corresponding to a difference between a damping force required to obtain an optimum damping force in the front wheel suspension units and a damping force actually generated in the front wheel suspension units; and g) rear wheel suspension controlling means for deriving an optimum damping force on the basis of the correction value past by the derived time difference and the present input signals derived from the detecting means placed on the rear wheel positions and for outputting the change control signal to the damping force coefficient changing means placed in the rear wheel suspension units when deriving the optimum damping force.

The above-described object can also be achieved by providing a method for controlling a damping force of a vehicular suspension system, the vehicular suspension system having a plurality of suspension units, each suspension unit being intervened between one of front and rear tire wheels and vehicular body and having a relatively displaceable sprung mass member and unsprung mass member and damping force coefficient changing means, installed between the sprung mass member and unsprung mass member in each suspension unit, for changing a damping force acted upon a direction of relative displacement between the sprung mass member and unsprung mass member at a multiple number of stages, comprising the steps of: a) detecting a factor of determining a vehicular behavior and outputting signals indicative thereof; b) responsive to the signals derived in the step a) for outputting a change control signal to each damping force coefficient changing means so that the damping force generated by the damping force coefficient changing means is changed on the basis of the signals derived in the step a); c) deriving a time difference between a time at which the front wheels have passed on a road surface and a time at which the rear wheels have passed on the same road surface; d) deriving a correction value corresponding to a difference between a damping force required to obtain an optimum damping force in the front wheel suspension units and a damping force actually generated in the front wheel suspension units; and e) deriving an optimum damping force on the basis of the correction value past by the derived time difference and the present input signals derived in the step a).

DETAILED DESCRIPTION OF THE PREFERRED EMBODIMENT

Reference will hereinafter be made to the drawings in order to facilitate a better understanding of the present invention.

Figure 1:
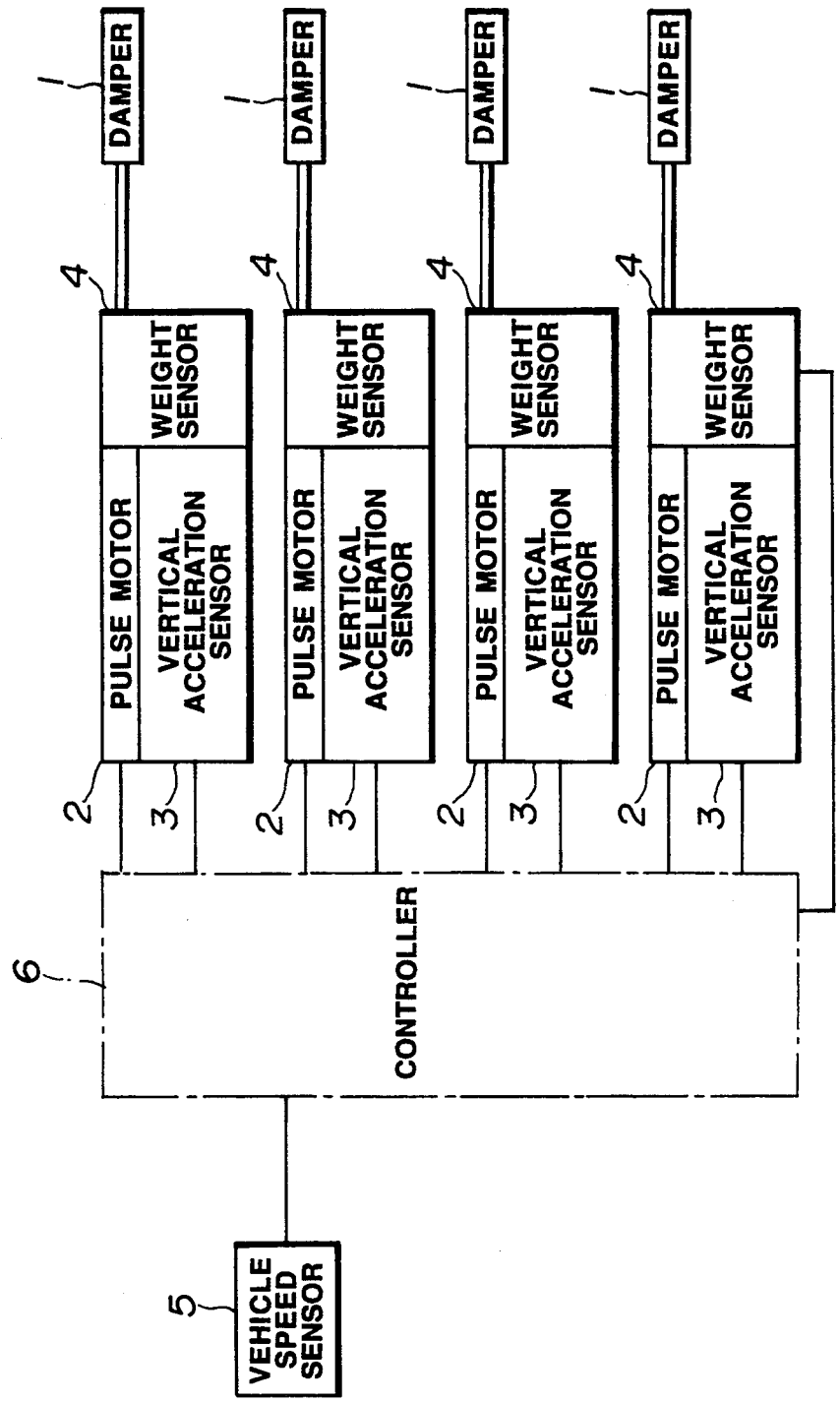
FIG. 1 is an overall circuit block diagram of a damping force controlling system in a preferred embodiment according to the present invention.

FIG. 1 shows a damping force controlling system in a preferred embodiment according to the present invention.

Dampers generally denoted by 1 are damping force variable type dampers and their damping force characteristics can be varied at multiple number of stages of damping force characteristic positions. The structure of the damper is exemplified by a U.S. Pat. No. 4,961,483, (the disclosure of which is herein incorporated by reference).

It is also noted that each structure of the dampers 1 shown in FIG. 1 is exemplified by a Japanese Patent Application First Publication No. Heisei 3-84237 in which the damping force characteristic can be varied at unlimited stages.

Figure 2:
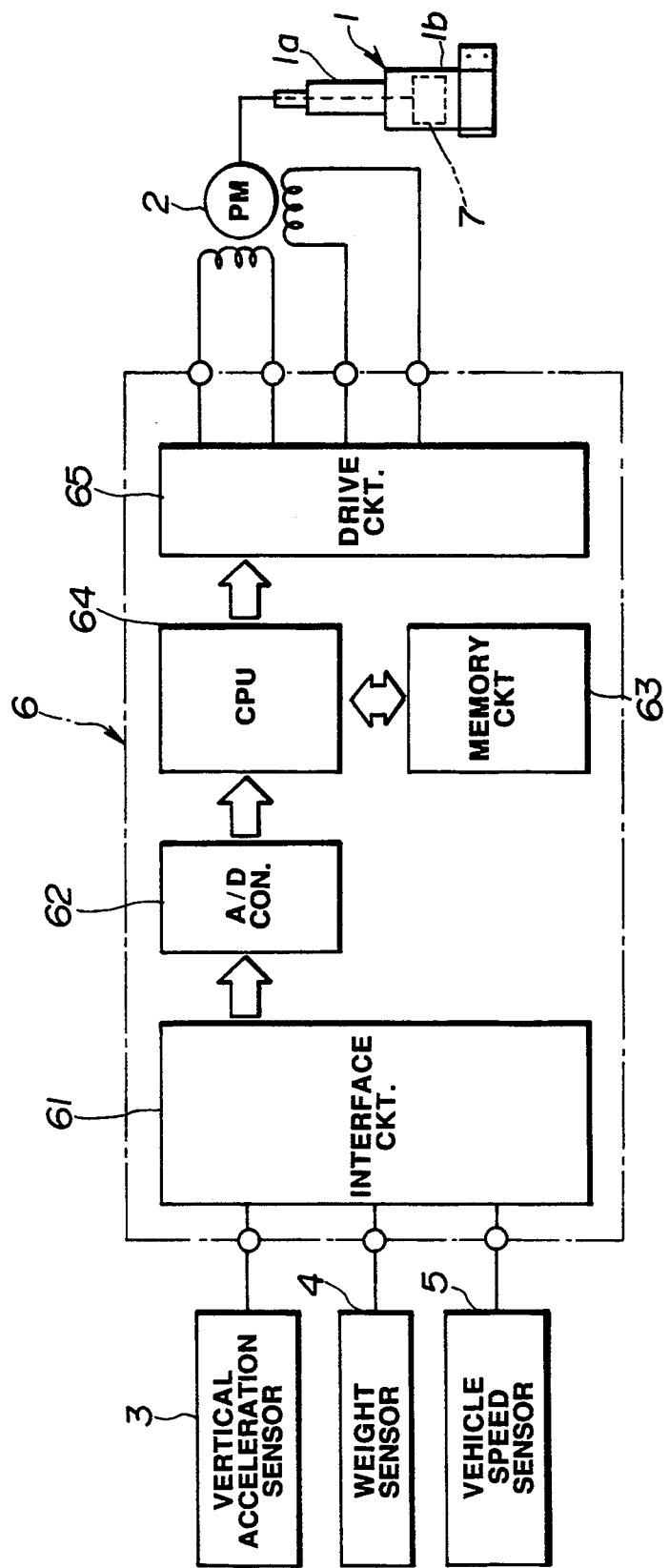
FIG. 2 is a circuit block diagram of an essential part of the damping force controlling system in the preferred embodiment according to the present invention.

As shown in FIG. 2, each of the dampers 1 includes: a piston rod 1a (unsprung mass member) attached onto a vehicular body side; a cylinder (sprung mass member) 1b attached onto a vehicular axle, thus each damper being intervened between each front/rear tire wheel and vehicular body; and damping force coefficient adjusting means (mechanism) 7 having a hydraulic flow adjuster installed in the piston rod 1a. The damping force coefficient adjusting means 7 is rotated in response to a drive signal derived from a pulse motor 2 so that a damping force range in an expansion stroke and in a compression stroke can be varied at eight stages from a soft position to a hard position.

The pulse motor 2 drives the damping force adjusting means 7 of the damper 1 to vary the position of the damping force adjusting means (mechanism) 7 at the multiple number of stages, thus the damping force adjusting means 7 changing the damping force range at one of the eight stages.

A vertical acceleration sensor 3 detects an acceleration in a vertical direction of a sprung mass, i.e., a vehicle body and outputs an electric signal according to a magnitude of the vertical acceleration.

A weight sensor 4 is installed as relative velocity detecting means which detects a relative velocity between the unsprung mass and sprung mass and is installed on a vehicular mount portion of the damper 1, for example, for detecting an input weight applied from the damper 1 to the vehicle body and outputting an electrical signal according to the detected weight. The structure of the weight sensor 4 is exemplified by U.S. Pat. application Ser. No. 07/661,007 filed on Feb. 26, 1991, now U.S. Pat. No. 5,163,660 (the disclosure of which is herein incorporated by reference).

A controller (control unit) 6 outputs the drive signal to the pulse motor 2 on the basis of the input signals derived from the vertical acceleration sensor 3 and weight sensor 4 so that the damper 1 exhibits an optimum damping force characteristic.

That is to say, the controller 6 includes an interface circuit 61 which inputs a signal derived from the vertical acceleration sensor 3 and weight sensor 4, an A/D converter 62 which converts an input analog signal into a corresponding digital signal, and CPU 64 which executes controls of searching, retrieving, determination, and arithmetic operation on the basis of the input signals and data maps DM (refer to FIG. 2) stored in a memory circuit 63. A drive circuit 65 which outputs the drive signal to the pulse motor 2 on the basis of a result of control operation executed by the CPU 64.

It is noted that although, in FIG. 2, the other three pulse motors 2, dampers 1, vertical acceleration sensor 3, and weight sensor 4 are not shown, they are naturally connected to the controller 6.

Figure 3:
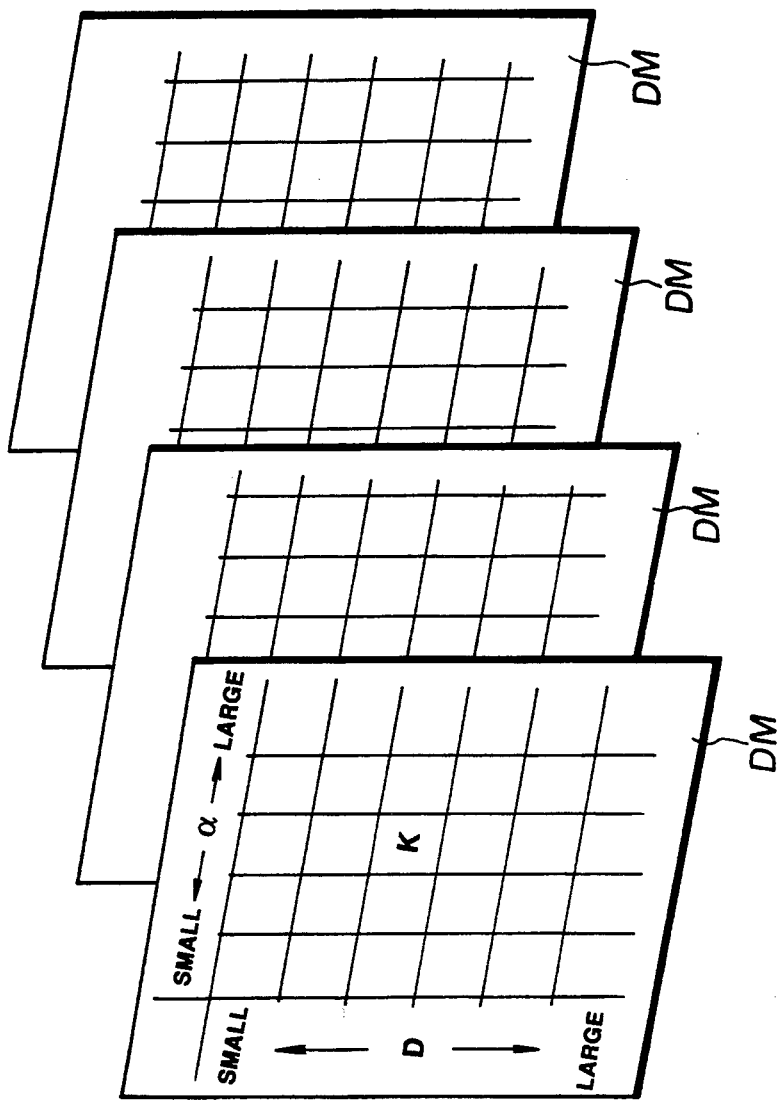
FIG. 3 is an explanatory view of data maps stored and used in the damping force controlling system in the preferred embodiment according to the present invention shown in FIG. 1.

Next, the data maps DM stored in the memory circuit 63 will be explained below with reference to FIG. 3.

The data maps DM are depicted by a plurality of sheets of data maps DM. The data maps DM enable a search for an optimum damping force coefficient according to an unsprung mass acceleration $\alpha$ and weight D. That is to say, the data maps DM indicate values $\alpha$ of the unsprung mass acceleration input from the unsprung mass acceleration sensor 3 along the rows, values of the weight data D input from the weight sensor 4 along the columns, respective intersections indicating the optimum damping force coefficient corresponding to the unsprung acceleration data $\alpha$ and weight data D. In addition, a left upper corner of each data map DM at a present damping force coefficient is referred to so that the optimum damping coefficient is searched on the basis of the input data. Hence, the data maps DM are stored in the form of a number of changeable damping coefficient stages.

It is noted that although the data maps DM are basically referred to the present stage of damping force coefficient from among the data maps DM, the stage of damping force is shifted toward a higher side as an oil temperature within the damper 1 is increased. As the oil temperature is increased, the stage of the damping force is shifted toward a lower side.

The vertical acceleration sensor 3 is called a vertical accelerometer (but hereinafter, referred simply to as a G sensor) and the weight sensor 4 is referred to as a load sensor.

The structure of the controller 6 including such sensors as described above is exemplified by a U.S. Pat. application Ser. No. 07/682,593 filed on Apr. 8, 1991, now U.S. Pat. No. 5,323,319 (the disclosure of which is herein incorporated by reference).

Figure 4:
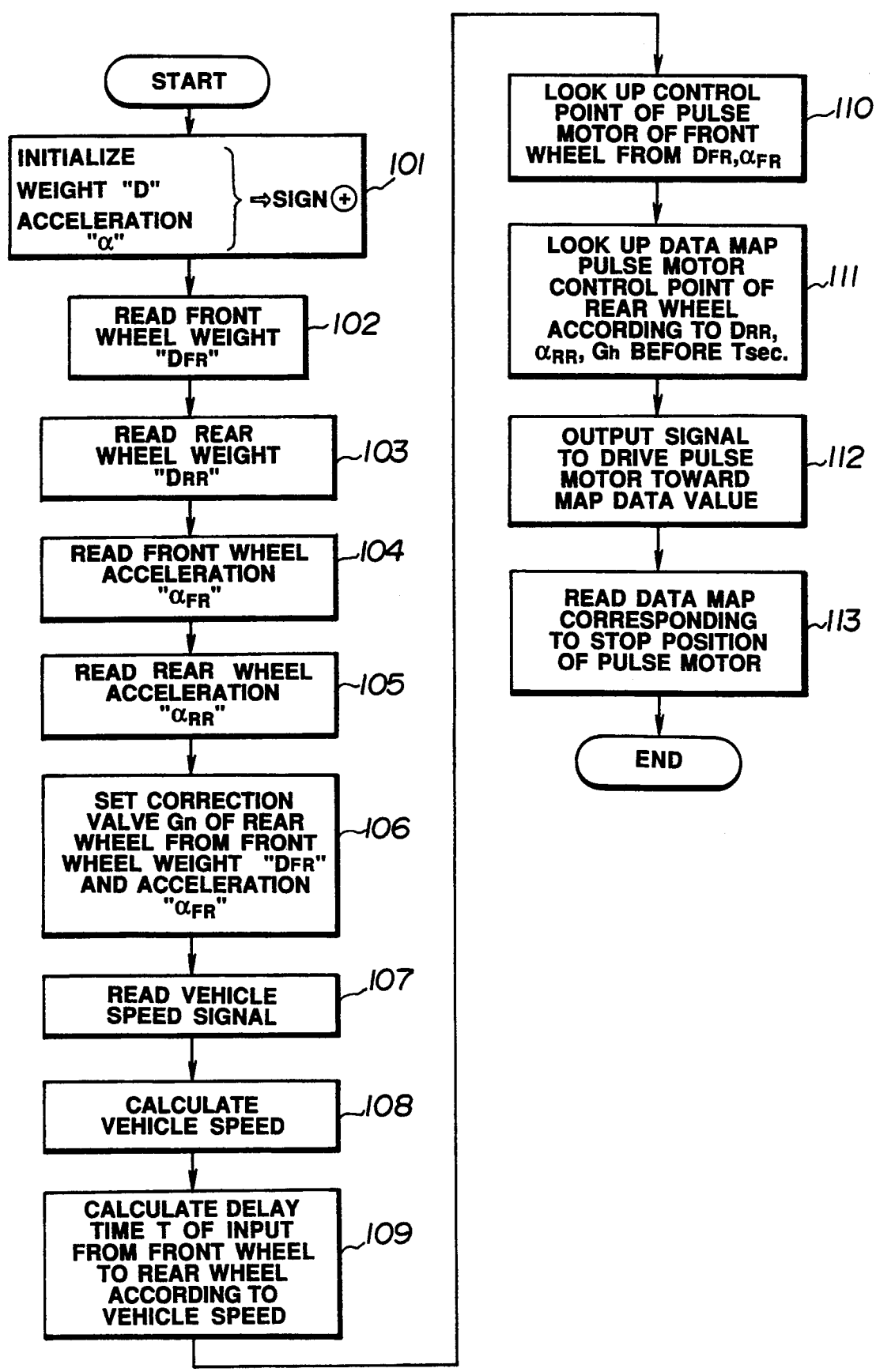
FIG. 4 is an operational flowchart executed in a controller of the damping force controlling system in the preferred embodiment.
Figure 5:
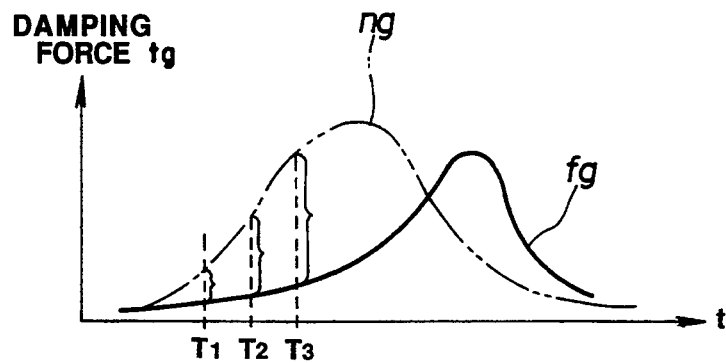
FIGS. 5, 6 and 7 are characteristic graphs of controlled damping forces.

Next, the contents of control executed by the controller 6 will be described with reference to FIG. 4.

In step 101, the controller 6 is initialized. That is to say, signs of the weight D and acceleration $\alpha$ are set to a plus side (+) (upper direction with respect to the vehicular body).

In step 102, the CPU 64 reads values of the front wheel side weight data $D_{FR}$ input from the weight sensor 4 placed at the front wheel positions.

In the subsequent step 103, the CPU 64 reads values of the rear wheel side weight data $D_{RR}$ input from the weight sensor 4 placed at rear wheel positions.

In step 104, the CPU 64 reads the acceleration data at the front wheel sides $\alpha_{FR}$ input from the G sensors 3 placed at the front wheel positions.

In the subsequent step 105, the CPU 64 reads the acceleration data $\alpha_{RR}$ input from the G sensors 3 placed at the rear wheel positions.

In step 106, the CPU 64 sets a correction value $G_h$ for each rear wheel according to the front wheel side weight data $D_{FR}$ and front wheel acceleration data $\alpha_{FR}$.

The correction value $G_h$ refers to a difference between a required damping force derived on the basis of data ($D_{FR}$, $\alpha_{FR}$) on the front wheel positions and an actually generated damping force $f_g$ and is derived per a predetermined short period of time.

In step 107, the CPU 64 reads a vehicle speed signal derived from a vehicle speed sensor 5.

In step 108, the CPU 64 calculates the vehicle speed on the basis of the vehicle speed signal.

In step 109, the CPU 64 calculates an input delay time T from each front wheel to each rear wheel according to the vehicle speed. That is to say, since one of the rear wheels basically passes along a road surface on which one of the front wheels has passed, the time T can be derived according to the vehicle speed and interval between the front and rear wheels.

In step 110, the CPU 64 retrieves a control point of two of the pulse motors 2 placed on the front wheel side from the data maps DM on the basis of the front wheel side weight data $D_{FR}$ and front wheel side acceleration data $\alpha_{FR}$.

In the subsequent step 111, the control point of two of pulse motors 2 placed on the rear wheel sides is retrieved from the rear wheel side weight data $D_{RR}$, rear wheel side acceleration data $\alpha_{RR}$, and correction value $G_h$ before T seconds.

Figure 6:
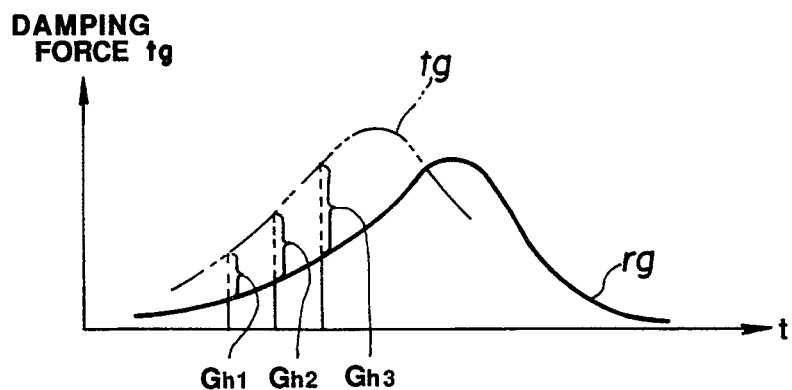

That is to say, as shown in FIG. 6, the control point which forms a corrected target damping force $t_g$ which is a result of addition of the correction value $G_h$ to a damping force rg generated in a case where the damping force is controlled only on the basis of the data $D_{RR}$, $\alpha_{RR}$ of the rear wheel positions is retrieved from the data maps DM.

In step 112, each pulse motor 2 receives the drive signal from the drive circuit 65, the drive signal being based on the data map value retrieved from the data maps DM.

In step 113, the CPU 64 reads the data map DM corresponding to one of the stages of the damping force coefficient of the damping force coefficient adjusting means 7 changed through the process in the step 112 (corresponds to a stop position of the pulse motor 2) and carries out a process for the subsequent damping force control.

Thus, one operational flow is ended.

The controller 6 repeats the above flow.

Next, an operation of the damping force controlling system in the preferred embodiment will be explained below.

Each of the two front wheel side dampers 1 in the vehicular suspension is controlled so as to provide the optimal damping force, the data maps DM being searched on the basis of front wheel side acceleration data $\alpha_{FR}$ and front wheel side weight data $D_{FR}$ derived from the G sensors 3 and weight sensors 4 shown in FIG. 1.

On the other hand, each of the two rear wheel side dampers 1 is controlled so as to provide the optimal damping force not only on the basis of rear wheel side acceleration data $\alpha_{RR}$ and rear wheel side weight data $D_{RR}$ derived from the G sensors 3 and weight sensors 4 placed on the rear wheel positions but also by searching the data maps DM with the addition of the correction value $G_h$ derived T seconds before one of the rear wheels has passed (in other words, derived when one of the front wheels has passed).

Figure 7:
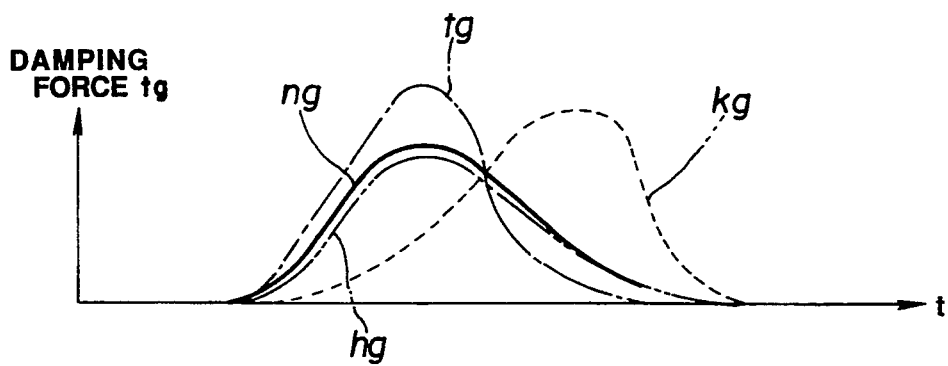

FIG. 7 shows a damping force characteristic graph indicting such a control process described above.

In FIG. 7, ng on a solid line denotes a required damping force required to obtain an optimum comfort in response to an input to be described later.

In FIG. 7, tg denotes a corrected target damping force, i.e., a damping force which is a target of control to generate the required damping force ng. The corrected target damping force tg needs to be set such that the corrected target damping force tg is higher than the required damping force ng with a rising delay of the damping force taken into account due to the presence of the rising delay.

In addition, kg denotes a non-corrected generated damping force which is the generated damping force when no corrected value $G_H$ is added. In other words, the non-corrected generated damping force kg corresponds to the damping force generated in a case when the damping force coefficient change control is carried out only on the basis of the rear wheel side data $D_{RR}$, $\alpha_{RR}$. Due to the response delay and/or rising delay, the damping force is insufficient against the required damping force at the former half of control, hg denotes a corrected generated damping force which is the damping force actually generated when the damping force control is carried out toward the corrected target damping force tg so that the damping force characteristic which is approximated to the required damping force ng.

As described above, since, in the damping force controlling system of the preferred embodiment, the corrected value $G_h$ set before T seconds on the basis of the front wheel side data ($D_{FR}$, $\alpha_{FR}$) detected preceding the pass of the rear wheels is added to a control condition in the rear wheel side damping force coefficient changing control, so that the optimization of the control timing in the rear wheel side damping coefficient changing control and optimization of the damping force become possible. Thereby, the vehicular comfort can be improved.

Since such an expensive distance sensor as in the previously proposed damping force control disclosed in the Japanese Utility Model Registration Application Publication No. Showa 60-47612 is not required, a lower cost of manufacture of the damping force control and system simplification can be achieved.

In addition, since, in the preferred embodiment, the optimal damping force is set by the search in the data maps DM stored in the memory circuit 63, the structure of the controller 6 can be simplified. The cost can be reduced and a control response characteristic can be improved due to the mere search in the data maps.

Although in the preferred embodiment the dampers 1 are used in the vehicular suspension, the vehicular suspension may include an actuator which generates the damping force in a direction so as to relatively displace both unsprung mass member and sprung mass member or, alternatively, may include means for generating simultaneously both damping force and driving force (=control force).

The number of stages the damping force coefficient is changed by means of the damping force coefficient changing means (mechanism) 7 may be arbitrary.

Although in the preferred embodiment the data map looking up method is used, the optimal damping force characteristic may be derived by the calculation of the CPU 64.

Furthermore, although in the preferred embodiment the vehicle speed sensor may be used as the vehicle speed detecting means, another sensor, e.g., a longitudinal acceleration sensor may be used in which the longitudinal acceleration with respect to the vehicular body derived from the horizontal acceleration sensor is calculated to derive the vehicle speed.

As described hereinabove, since, in the damping force controlling system and method according to the present invention, the controller includes the time setting block for deriving the time difference of pass on the same road surface between the front wheels and rear wheels, the correction block which derives the correction value which corresponds to the difference between the required damping force required to obtain the optimal damping force in the front wheel suspension units and actually generated damping force, a rear wheel control block which derives the optimal damping force in the rear wheel suspension units on the basis of the present input signal from the rear wheel side input means (detecting means) and the correction value past by the time difference and outputs the change control signal to the damping force changing means placed on the rear wheel positions, the optimal damping force at the optimum timing can be obtained by the added correction value past by the time difference when the damping force control time for the suspension units placed on the rear wheel positions. Thus, the vehicular comfort can be improved. In addition, no distance sensor is required so that the cost reduction can be achieved.

It will fully be appreciated by those skilled in the art that the foregoing description has been made to the preferred embodiment and various changes and modifications may be made without departing from the scope of the present invention which is to be defined by the appended claims.

What is claimed is:

1. A damping force controlled suspension system for an automotive vehicle, comprising:
   a) a plurality of suspension units, each suspension unit being intervened between one of front and rear tire wheels and vehicular body and having relatively displaceable sprung mass member and unsprung mass member;
   b) damping force coefficient changing means, installed between the sprung mass member and unsprung mass member in each suspension unit, responsive to an input change control signal for changing a damping force acted upon a direction of relative displacement between the sprung mass member and unsprung mass member at a multiple number of stages;
   c) detecting means, installed on one of the front wheel positions and on one of the rear wheel positions, for detecting a factor of determining a vehicular behavior and outputting signals indicative thereof;
   d) controlling means responsive to the signals derived from the detecting means for outputting the change control signal to each damping force coefficient changing means so that the damping force generated by the damping force coefficient changing means is changed on the basis of the signals derived from the detecting means;
   e) time difference setting means for deriving a time difference between a time at which the front wheels have passed on a road surface and a time at which the rear wheels have passed on the same road surface;
   f) correction means for deriving a correction value corresponding to a difference between a damping force required to obtain an optimum damping force in the front wheel suspension units and a damping force actually generated in the front wheel suspension units; and
   g) rear wheel suspension controlling means for deriving an optimum damping force on the basis of the correction value past by the derived time difference and the present input signals derived from the detecting means placed on the rear wheel positions and for outputting the change control signal to the damping force coefficient changing means placed in the rear wheel suspension units when deriving the optimum damping force.

2. A damping force controlled vehicular suspension system as set forth in claim 1, wherein the controlling means includes a controller and wherein the controller includes the time difference setting means, correction means, and rear wheel suspension controlling means.

3. A damping force controlled vehicular suspension system as set forth in claim 2, wherein the detecting means includes vehicle speed detecting means for detecting a vehicle speed and outputting a vehicle speed signal indicative thereof; a weight sensor installed on each unsprung mass member of the suspension units for detecting a weight applied onto the unsprung mass member of each suspension unit; and a vertical acceleration sensor installed on each unsprung mass member for the suspension units for detecting a vertical acceleration of the unsprung mass member and outputting a vertical accleration signal indicative thereof.

4. A damping force controlled vehicular suspension system as set forth in claim 3, wherein the correction value deriving means derives the correction value Gh for each rear suspension unit from both front wheel side weight data $D_{FR}$ and front wheel acceleration data $\alpha_{FR}$ derived from the weight sensors and vertical acceleration sensors both being placed on the front suspension units, respectively.

5. A damping force controlled vehicular suspension system as set forth in claim 4, wherein the correction value Gh corresponds to a difference between a required damping force ng obtained on the basis of the data ($D_{FR}$, $\alpha_{FR}$) of the suspension units placed on the front wheel positions and an actually generated damping force fg in the suspension units placed on the front wheel positions.

6. A damping force controlled vehicular suspension system as set forth in claim 5, wherein the time difference setting means calculates an input delay time T of the detecting means from the front tire wheel positions to the rear tire wheel positions on the basis of the vehicle speed and derives a distance interval between the front and rear wheels of the vehicle.

7. A damping force controlled vehicular suspension system as set forth in claim 6, wherein a control point of a pulse motor constituting the damping force coefficient changing means placed in each of the front wheel suspension units is searched from one of data maps DM on the basis of the front wheel weight data $D_{FR}$ and front wheel acceleration data $\alpha_{FR}$.

8. A damping force controlled vehicular suspension system as set forth in claim 7, wherein a control point of a pulse motor constituting the damping force coefficient changing means placed in each of the rear wheel suspension units is searched from one of data maps DM on the basis of rear wheel side weight data $D_{RR}$, rear wheel side acceleration data $\alpha_{RR}$, and correction value Gh before the input delay time T.

9. A damping force controlled vehicular suspension system as set forth in claim 8, wherein the control point of the pulse motor constituting the damping force coefficient changing means placed in each of the rear wheel suspension units is searched from one of the data maps DM, the control point forming a corrective target damping force tg which is an added value between a generated damping force rg in a case based on the rear wheel position data $D_{RR}$ and $\alpha_{RR}$ and the correction value Gh.

10. A damping force controlled vehicular suspension system as set forth in claim 9, wherein the corrective target damping force tg is set higher than the required damping force ng.

11. A method for controlling a damping force of a vehicular suspension system, the vehicular suspension system having a plurality of suspension units, each suspension unit being intervened between one of front and rear tire wheels and vehicular body and having a relatively displaceable sprung mass member and unsprung mass member and damping force coefficient changing means, installed between the sprung mass member and unsprung mass member in each suspension unit, for changing a damping force acted upon a direction of relative displacement between the sprung mass member and unsprung mass member at a multiple number of stages, comprising the steps of:

a) detecting a factor of determining a vehicular behavior and outputting signals indicative thereof;

b) responsive to the signals derived in the step a) for outputting a change control signal to each damping force coefficient changing means so that the damping force generated by the damping force coefficient changing means is changed on the basis of the signals derived in the step a);

c) deriving a time difference between a time at which the front wheels have passed on a road surface and a time at which the rear wheels have passed on the same road surface;

d) deriving a correction value corresponding to a difference between a damping force required to obtain and optimum damping force in the front wheel suspension units and a damping force actually generated in the front wheel suspension units; and e) deriving an optimum damping force on the basis of the correction value past by the derived time difference and the present input signals derived in the step a).

12. A method of controlling a vehicle suspension comprising the steps of:

monitoring a first load applied to a front suspension unit;

monitoring first vertical acceleration at location on a vehicle chassis proximate the front suspension unit;

controlling the front suspension unit in accordance with the monitored first load and the monitored first vertical acceleration;

developing a damping correction value based on the first load and the first acceleration;

monitoring a second load applied to a rear suspension unit;

monitoring second vertical acceleration at a location proximate said rear suspension unit;

determining a target damping level for said rear suspension unit based on the monitored second load and monitored second vertical acceleration;

determining vehicle speed;

determining a delay time based on the vehicle speed;

modifying the target damping level using said damping correction value after the expiration of said delay time to produce a modified target damping level; and controlling the rear suspension unit using the modified target damping level.

13. A vehicle suspension control arrangement comprising:

means for monitoring a first load applied to a front suspension unit;

means for monitoring first vertical acceleration at location on a vehicle chassis proximate the front suspension unit;

means for controlling the front suspension unit in accordance with the monitored first load and the monitored first vertical acceleration;

means for developing a damping correction value based on the first load and the first acceleration;

means for monitoring a second load applied to a rear suspension unit;

means for monitoring second vertical acceleration at a location proximate said rear suspension unit;

means for determining a target damping level for said rear suspension unit based on the monitored second load and monitored second vertical acceleration;

means for determining vehicle speed;

means for determining a delay time based on the vehicle speed;

means for modifying the target damping level using said damping correction value after the expiration of said delay time to produce a modified target damping level; and means for controlling the rear suspension unit using the modified target damping level.

* * * * *